(12) United States Patent
Wilkie

(10) Patent No.: US 7,150,142 B2
(45) Date of Patent: Dec. 19, 2006

(54) CHICKEN CHAIN

(75) Inventor: Donald Wilkie, Marysville, MI (US)

(73) Assignee: Wilkie Brothers, Marysville, MI (US)

( * ) Notice: Subject to any disclaimer, the term of this patent is extended or adjusted under 35 U.S.C. 154(b) by 0 days.

(21) Appl. No.: 11/061,094

(22) Filed: Feb. 19, 2005

(65) Prior Publication Data

US 2006/0185344 A1 Aug. 24, 2006

(51) Int. Cl.
*B21L 9/04* (2006.01)
*F16G 13/08* (2006.01)

(52) U.S. Cl. .......................... 59/78; 59/8; 59/12; 59/84; 474/226; 198/851

(58) Field of Classification Search ................ 59/35.1, 59/84, 78, 10, 8, 13; 198/850, 851; 474/222, 474/226, 225
See application file for complete search history.

(56) References Cited

U.S. PATENT DOCUMENTS

| | | | | |
|---|---|---|---|---|
| 2,068,862 A | * | 1/1937 | Lee | 59/85 |
| 2,938,329 A | * | 5/1960 | Onulak | 198/850 |
| 3,086,404 A | * | 4/1963 | Krekeler | 59/85 |
| 4,020,629 A | * | 5/1977 | Wilmot et al. | 59/85 |
| 4,043,215 A | * | 8/1977 | Long et al. | 59/85 |
| 4,263,779 A | * | 4/1981 | Petershack | 59/8 |
| 5,078,654 A | * | 1/1992 | Naz | 474/91 |
| 5,966,923 A | * | 10/1999 | Nakamura | 59/78 |

* cited by examiner

*Primary Examiner*—David Jones
(74) *Attorney, Agent, or Firm*—Ronald L. Hofer

(57) ABSTRACT

An improved chain, compatible with food grade lubricants, is capable of use in poultry and other meat processing facilities. The chain comprises pairs of side links alternating with center links, and held together with pins. A pair of lubricating wells is located on each side link, proximate the insertion point of the pins. The lubricating well provides lubricating access to the pins, and is capable of retaining lubricant such that lubricant is continuously provided to the pins and their pivot points throughout the operation of the chain.

4 Claims, 2 Drawing Sheets

Fig.2
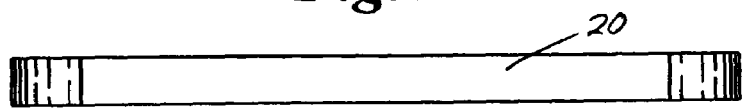
Fig.3 Fig.4 Fig.5
 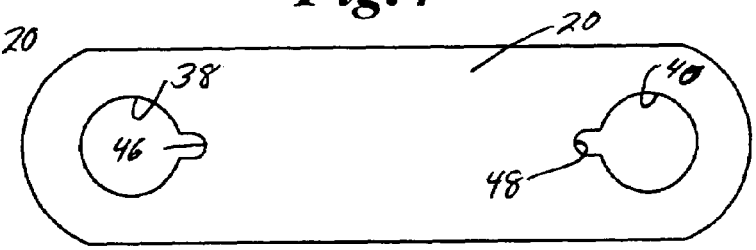 
Fig.6
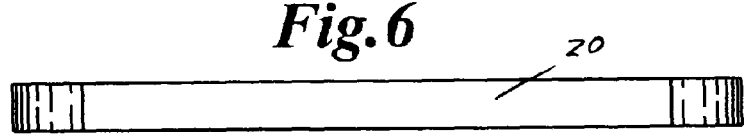
Fig.7
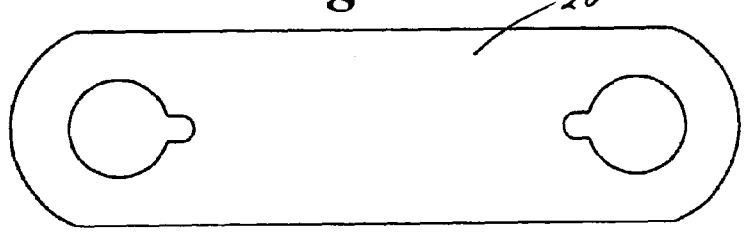

CHICKEN CHAIN

FIELD OF THE INVENTION

The present invention generally relates to a chain construction and more particularly to such an anti-collapsing chain having a loop type center link, such as a bar loop chain or a rivetless chain. Specifically, the invention is directed to a novel substantially solid center link that is adapted for easy lubrication of the center link and the retention pins therein.

BACKGROUND OF THE INVENTION

Rivetless chains consist of alternating units of central links and pairs of side links joined together by headed pins. Each center link consists of an individual piece of metal having a pair of laterally spaced side walls joined at their end by curved end walls, the side walls and end walls enclosing or surrounding an elongated slot. A pair of side links, each having an elongated slot at each end, is pivotally connected to each end of each center link by headed pins, each pin having a transverse head on each end thereof. The side links are formed at their ends with transversely extending recesses on their outer faces in which the heads of the pins are seated to lock the pin in position after the center links and side links have been coupled together. Each of the center links has a narrow central portion that tapers outwardly adjacent to the ends of the link to form thickened portions at the link ends. When the center links and side links are assembled by means of the headed pins to form a chain, its center links and side links are arranged in alternate relationship along the chain, each center link having connected to each end thereof a pair of face side links and each such pair of side links being connected at each end to an adjacent center link and so that pivotal movement is permitted between the adjacent center links and side links about the center of headed pin as an axis.

Bar loop chains are similar in structure to the rivetless chains. However, with a bar loop chain, the pin is secured in the seated position with a nut or other fastener, thus preventing the unwanted disassembly of the chain. The side links correspondingly lack the longitudinally extending recesses of the rivetless chain.

Rivetless chains and bar loop chains are preferred in many trolley type manufacturing settings since they will not readily collapse and can be easily adapted for use with a sprocket gear drive. Trolley systems are generally used in animal processing plants in order to ease the movement of carcasses between various stages of the processing procedure. The carcass is generally attached to an overhead trolley that transports the carcass along an endless defined path to the various processing stations. Trolleys are generally propelled along the endless path by either gravity, or by a motorized chain or cable.

Processors were unable to use lubricants on the trolley systems and chains due to possible contamination of the carcass from the lubricating oils. This resulting friction between the chain and the trolley system, and internal friction between the chain links and the retention pin caused frequent breaks in the chain due to fatiguing of the parts. The processing line would then have to be stopped while the chain was repaired.

Since lubricants could not be used on the chains, processors simply accepted these frequent chain breakages as a business cost. However, with the approval of H1 food grade lubricants, work stoppages due to broken chains can now be decreased. Lubricating oil can now be used on trolley systems and chains used in food processing plants.

U.S. Pat. No. 5,966,923 issued to Nakamura discloses a chain wherein lubricating oil is fed into a U-shaped or V-shaped recess in the connecting pin. Viscosity of the oil adheres it to the pin and prevents its immediate flow down the surface of the pin. As the chain moves, the lubricating oil then gradually flows down the pin, and providing continuous lubrication to the chain.

U.S. Pat. No. 5,078,654 issued to Naz discloses a center link for a rivetless chain. The center link has an integrally formed reservoir and lubricator for holding and distributing lubricant to connector pins between adjacent center links and side bars. The reservoir is an impression in the curved end wall portions having an arcuate concave surface in the end wall portion. It is designed to accept and hold a desired amount of lubricant from a source. The lubricant is then distributed to the connector pins through normal chain movement.

Despite the improvements described, a need remains for improvements to self-lubricating chains, especially in the food processing industry. H1 graded lubricants may not work well with the self-lubricating chains described above, which rely on viscosity of the lubricating oil for proper function. Furthermore, there is always a desire to reduce the machining costs of the self-lubricating chain links described in the prior art, or employ a center link that reduces the cost of such machining.

Accordingly, the present invention is an improved chain with improved side links which facilitate lubrication of connector pins of a rivetless or bar loop conveyor chain. From the following detailed description taken in conjunction with the accompanying drawings and following claims, further understanding of the present invention and its advantages will become apparent.

SUMMARY OF THE INVENTION

One embodiment of the invention is an improved bar loop chain for use in meat processing plants, particularly poultry processing. The chain is compatible with H1 food grade lubricants, and facilitates lubrication of the rotation pin of the bar loop chain by providing a lubrication well adjacent to the pivot hole.

The lubrication well provides an access point through which lubrication can be directly applied to the chain pin. Alternatively, the lubrication well can be sized such that a viscous lubricant applied to the crossbar links proximate the lubrication well is retained within the well. Through normal action of the chain, the lubricant is distributed from the well to the pin, thereby providing lubrication to the chain's moving parts.

BRIEF DESCRIPTION OF THE DRAWINGS

FIG. 2 is a right side elevation view of a crossbar link for a bar loop chain in accordance with the principles of the present invention.

FIG. 3 is a front elevation view of the structure shown in FIG. 2.

FIG. 4 is a top plan view of the structure shown in FIG. 2.

FIG. 5 is a rear elevation view of the structure shown in FIG. 2.

FIG. 6 is a left side elevation view of the structure shown in FIG. 2.

FIG. 7 is a bottom plan view of the structure shown in FIG. 2.

DETAILED DESCRIPTION OF A PREFERRED EMBODIMENT

Figure 1:
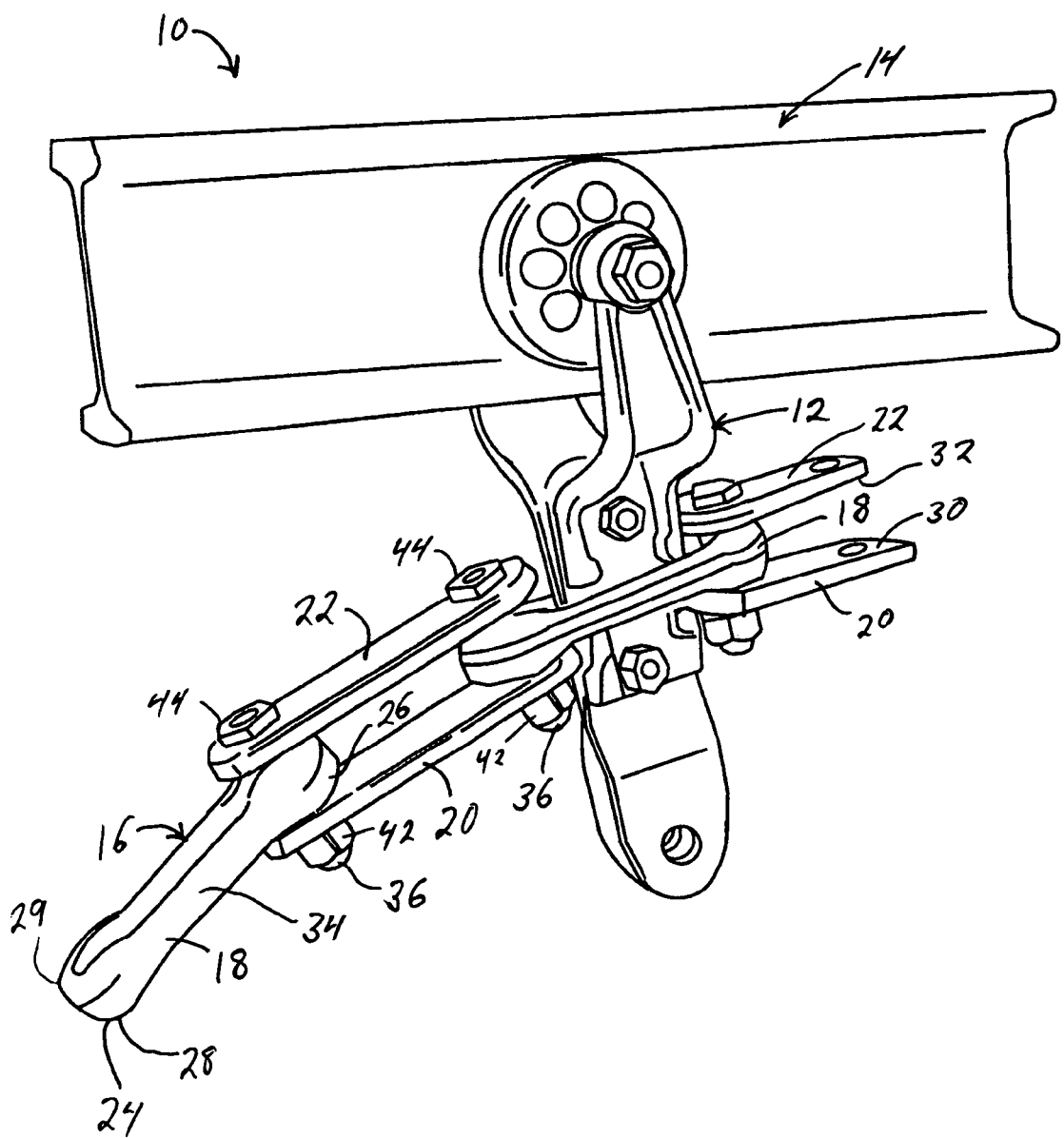
FIG. 1 is a perspective view of a trolley system utilizing a bar loop chain.

Turning to the FIGURES, particularly FIG. 1, a typical trolley system as used in a processing plant is illustrated and indicated by the numeral 10. A trolley 12 is moveably attached to an overhead track 14. Trolley 12 as shown is attached to chain 16 by insertion through center link 18, but can be attached to the chain by any means known in the art. The chain shown is a bar loop chain, consisting of alternating center links 18, and side link pairs 20 and 22.

As shown, center links 18 can be provided with ends 24 and 26 each having a convex curvature. The purpose of this curvature is to provide rounded surfaces 28 and 29 upon which inner faces 30 and 32 of the adjacent side links of the chain bear so that when the chain is passing around a vertical curve or bend in the conveyor's line of travel, relative movement between the side links and the ends of the center links may occur without undue binding or cramping such as would occur if the top and bottom surfaces of the thickened end portions of the center link were flat and in relative close contacting engagement with the flat interfaces of the side links. Each of the center links has a narrow central portion 34 that tapers outwardly adjacent to the ends of the link to form thickened portions at the center link ends 24 and 26.

Center links 18 are pivotally connected at each end 24 and 26 thereof by pins 36 to a pair of side links 20 and 22, each side link having respective pivot holes 38 and 40 at each end. Each pin 36 has a head 42 on one end thereof and is held in place by a nut 44 attached to the other end of the pin, thereby preventing unwanted disassembly of chain 16. When center links 18 and side links 20 and 22 are assembled by means of headed pins 36 to form chain 16, its center links 18 and pairs of side links 20 and 22 are arranged in alternating relationship along chain 16, each center link 18 having connected to each end thereof a pair of side links 20 and 22 and each such pair of side links 20 and 22 being connected at each end to an adjacent center link 18 and so that pivotal movement is permitted between the adjacent center links and crossbars about the center of headed pin 36 as an axis.

Now referring to FIG. 2 through FIG. 7, a side link 20 used in the current invention is illustrated. It will be appreciated that side link 22 is identical in construction to side link 20 and, hence, the following description with respect to side link 20 is fully applicable also to side link 22. The side link 20 is made of a suitable metal such as aluminum or steel and is substantially solid, except for pivot holes 38 and 40 that are located at each end. Pivot holes 38 and 40 are sized such that they allow for free rotation of pins 36 within their associated holes 38 and 40, but are small enough to prevent heads 42 of the pins and pin nuts 44 from passing through the pivot holes.

Lubricating wells 46 and 48 are located adjacent to and intersecting each of the pivot holes 38 and 40. Each lubricating well 46 and 48 extends through the entirety of the side link 20 or 22 and provides lubricating access to the inserted pins 36 . Each lubricating well is preferably sized such that it extends from beneath the pin head 42 and pin nut 44 and can be accessed when the chain is assembled.

When the chain is assembled, the lubricating well provides easy access to the pins, without having to disassemble the chain. Lubricating oil can be applied directly to the pin by accessing it through the lubricating well.

In another embodiment, lubricating oil can be deposited atop the side link, such that it will slowly traverse through the well and onto the pin. In such an arrangement, the lubricating well acts as a lubrication reservoir. When the pin is inserted through the pivot hole, the interstitial space formed by the lubricating well is able to retain some lubricating oils therein. The viscosity of the oil in part controls this. However, the inventors have recognized that by varying the nut and bolt head size of a bar loop chain, the size of the lubricating well can be adjusted such that oils of differing viscosities can be utilized without replacement or retooling of the side links. In such an embodiment, lubrication is deposited atop the side link, proximate the lubrication well. Lubrication is drawn into the well by gravity, and adhesive/cohesive forces. A viscous lubricant will then remain within the lubricating well through interaction between the well, the pin and the lubricant. When the side link turns about the pin, lubrication within the well adheres to the periphery of the pin. In this way normal operation of the chain distributes lubricant to those various portions of the pin that come into contact with the lubricating well.

It is to be understood that the foregoing description and specific embodiments are merely illustrative of the best mode of the invention and the principles thereof, and that various modifications and additions may be made to the apparatus by those skilled in the art, without departing from the spirit and scope of this invention, which is therefore understood to be limited only by the scope of the appended claims.

I claim:

1. A barloop chain comprising pairs of side links, center links, and pins for alternate connection of said pairs of side links and said center link, each side link being substantially solid and comprising a plurality of pivot holes located remote from each other for receiving said pin, and at least one lubricating well intersecting with and integral to each pivot hole, wherein said lubricating well is capable of retaining lubricating oil therein by adhesion of said lubricating oil to the sidewalls of said lubricating well.

2. The chain of claim 1, wherein said pins are bolts and nuts to prevent inadvertent disassembly of the chain links.

3. The chain of claim 2, wherein said bolts and nuts substantially cover the pivot holes.

4. The chain of claim 3, wherein said lubricating well is large enough to protrude from underneath of said bolt and nut.

* * * * *